March 31, 1936. F. MEES 2,035,493
TRAVELING BAG
Filed Feb. 21, 1935 2 Sheets-Sheet 1

Inventor
Frank Mees
by Rippey & Cassidy
His Attorneys.

March 31, 1936.  F. MEES  2,035,493
TRAVELING BAG
Filed Feb. 21, 1935  2 Sheets-Sheet 2
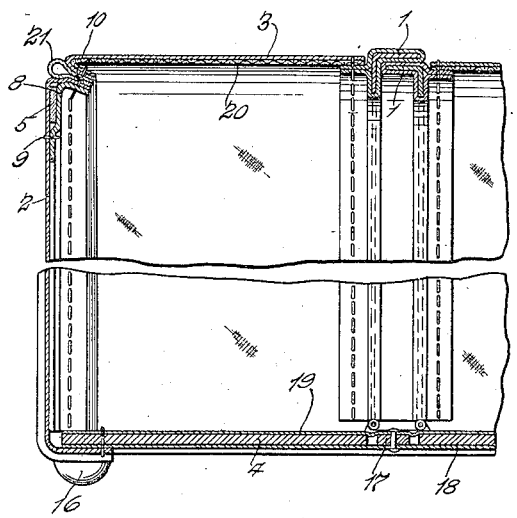
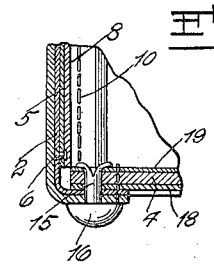
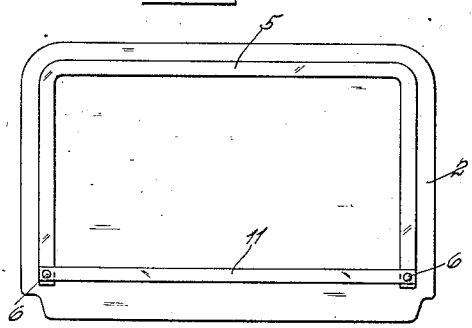
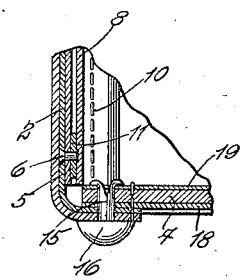
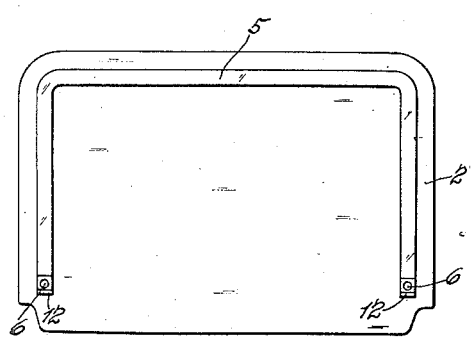
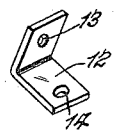
Inventor
Frank Mees
by Rippey & Cassidy
His Attorneys Patented Mar. 31, 1936

2,035,493

UNITED STATES PATENT OFFICE 2,035,493

TRAVELING BAG

Frank Mees, St. Louis, Mo., assignor to Herkert & Meisel Trunk Company, St. Louis, Mo., a corporation of Missouri Application February 21, 1935, Serial No. 7,494

3 Claims. (Cl. 190—49)

This invention relates to traveling bags, and more particularly to means for preserving the shape of a traveling bag having walls of pliable material.

Bags having walls of pliable material, such as Gladstone bags, may retain their shape for awhile but long before their usefulness is ended they may become distorted like an old fedora hat.

An object of this invention is to provide inexpensive means, simple in construction, to maintain the shape of a bag having walls of pliable material without departing from conventional form.

Other and specific objects of the invention will be apparent from the following detail description taken in connection with the accompanying drawings.

Fig. 6 is a vertical section on line 6—6, Fig. 1;

Fig. 7 is a detail section on line 7—7, Fig. 2;

Fig. 8 is a detail showing a modification of the invention including an additional sustaining member;

Fig. 9 is a detail view similar to Fig. 7 but including the modification shown in Fig. 8;

Fig. 10 is a view similar to Fig. 8 of another modification; and

Fig. 11 is a view of an angle piece used with the modification shown in Fig. 10.

Figure 1:
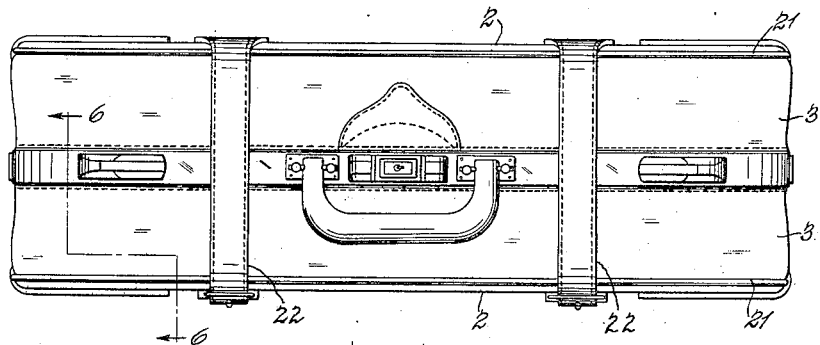
Fig. 1 is a top plan view of a Gladstone bag embodying the invention.

The drawings show the invention embodied in a Gladstone bag, which has flexible sides, each on a rigid central steel frame 1 and hinged along the bottom so as to open flat into two equal compartments. Each of the side portions includes a side wall 2 of leather, fabric or other pliable material and a connecting wall 3 extending between the side wall and the central steel frame 1 along the ends and top of the bag, also of pliable material. The bottom of each side portion includes a rigid member 4 of wood or stiff composition material. A yoke 5, constructed preferably from a flat steel bar relatively thin and relatively wide, extends along the end and top margins of the side wall. The yoke 5 is attached to the side wall 2 by means of rivets 6 which pass through holes 7 in the bottom of the yoke 5 and engage the side wall. The yoke is also secured to the wall 2 by a canvas strip 8, which is attached to the side wall by a line of stitching 9, engaging the side wall, and stitching 10 which engages the side wall 2 and the connecting wall 3, as well as the canvas strip 8. The nature of the yoke is such that, while resilient, it is nondeformable by ordinary use of the bag during its entire life. If desired, and as shown in Figs. 8 and 9, an additional supporting member 11 may be used. The member 11 is of the same material as the yoke 5 and is secured at its ends to the bottom of the yoke 5 by the rivets 6 and extends along the bottom margin of the side wall 2. Or, as shown in Figs. 10 and 11, the yoke 5 may be secured also to the rigid bottom member 4 by means of angle pieces 12, each of which has a hole 13 for engagement with a rivet 6 and a hole 14 for engagement with a rivet 15 which passes upwardly through the bottom rigid member 4 and which has a head 16, which serves as a dome or foot for the bottom of the bag.

The foregoing is a summary of the embodiment of the invention illustrated on the accompanying drawings, while the essential features of the invention are pointed out in the appended claims. A more detailed description of the invention and of the particular embodiment illustrated, which follows, will assist in understanding and practicing the invention.

The bottom of the bag includes relatively rigid members 4, one for each side of the bag, a relatively rigid hinge member 17, an outer layer of leather 18, fabric or similar flexible material, and an inner layer 19 of flexible material, preferably of canvas. As clearly shown in Fig. 6 of the drawings the flexible material 18 and 19 completes the hinges, whereby the bag may be opened and closed in a manner which is well understood.

The side walls 2 may or may not be reinforced by a layer of cardboard or the like to give added stiffness and form. The connecting walls 3, that is the end and top walls, are each reinforced, as specifically shown, by a stiffening material 20, such as burlap.

In constructing the bag the yoke 5 is superimposed upon the side wall member, as shown in Fig. 8, with or without the cross supporting member 11 and fastened by the rivets 6. Stitches 9 are passed through the strip 8 and the side wall 2, and the line of stitches 10 caused to engage the side wall 2, the strip 8, a finishing welt 21, the connecting wall 3, and the lining or stiffening member 20, as best shown in Fig. 5.

Figure 2:
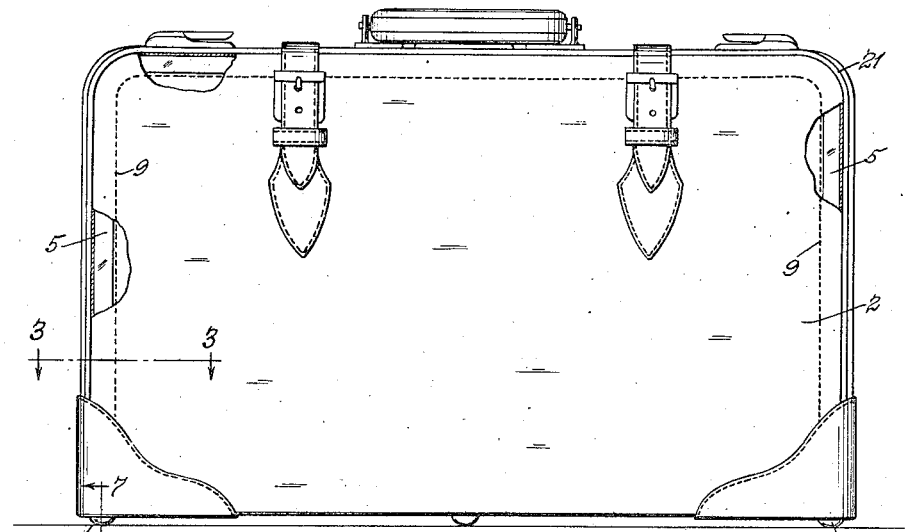
Fig. 2 is a side elevation.

Straps 22 are secured to the side walls of the two sides, as shown in Figs. 1 and 2, in a conventional manner. It is about these straps that the loss of shape occurs in the conventional bag. That is to say, after considerable use the ends of the bag will bulge out and the side walls between the straps will also bulge out, taking a misshapen appearance long before the bag has otherwise served its usefulness.

By the use of this invention, however, the side walls, while resilient, are nondeformable in ordinary use because the yoke 5 will not reach its elastic limit when bent, as it will be in ordinary use. When the cause of a temporary deformity has been removed the yoke 5 will return the side walls to their original form, thus retaining a permanent block or form to the bag.

Figures 3, 5:
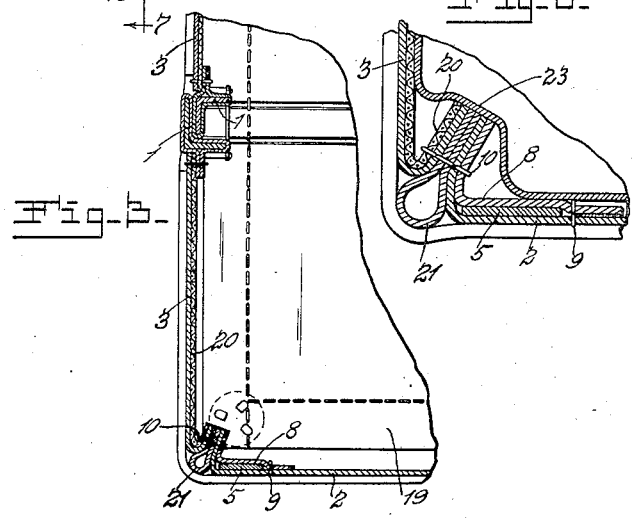
Fig. 3 is a section on line 3—3, Fig. 2.
Fig. 5 is a horizontal section through a corner of the bag near the bottom.
Figure 4:
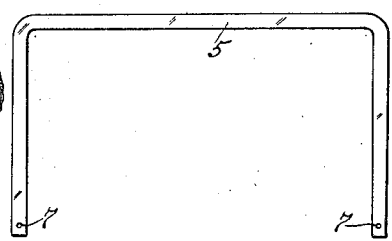
Fig. 4 is a plan view of a sustaining member or yoke.

A bag will ordinarily be finished by the use of a suitable inner lining 23 applied in a conventional manner and which, for convenience, has been shown only in Fig. 5. Other details of a bag have been illustrated but not specifically mentioned and will be understood to be of a conventional form and applied in a conventional manner.

The particular materials and the particular form and shape of the bag is immaterial except that it is contemplated that the side walls and connecting walls be of flexible material and incapable of holding a definite form over a long period of time in actual use. The yoke 5 and the strip 11 are preferably made of flat bar steel so that they will lie closely against the wall and at the same time be of sufficient strength to withstand deformity under ordinary usage for the life of the bag. It will be apparent, of course, that other materials serving the same purpose may be used as a matter of choice.

It will be obvious that various changes may be made in the details of construction, within the scope of the appended claims, without departing from the spirit of this invention.

I claim:

1. In a traveling bag having a side wall, a rigid bottom wall member, and top and end walls; a yoke comprising a strip of stiff resilient material having an upper portion extending along the inner side of the upper margin and end portions extending downwardly along the inner side of the end margins of said side wall, a strip of pliable material having one edge stitched to said side wall along the lower and inner edges of the top and end portions of said yoke respectively and having its opposite edge attached to said side wall at the opposite edges of said portions, a lining for the bag covering the inner surface of said side wall and also covering said strip, and angle pieces each having one end rigidly attached to said rigid bottom wall member and the opposite end extending between said lining and said side wall and rigidly attached to the lower end of the adjacent end portion of said yoke and said side wall.

2. In a traveling bag having a side wall, a rigid bottom wall member and top and end walls; a yoke comprising a strip of stiff resilient material having an upper portion extending along the inner side of the upper margin and end portions extending downwardly along the inner side of the end margins of said side wall, a lining for the bag covering the inner surface of said side wall, angle pieces each having one end rigidly attached to said rigid bottom wall member, and fasteners extending through said side wall and through the lower ends of said end portions of said yoke and through said angle pieces and securing said side wall and said yoke and said angle pieces together above the points of attachment of said angle pieces to said rigid bottom wall member.

3. In a traveling bag having a side wall, a rigid bottom wall member and top and end walls; a yoke comprising a strip of stiff resilient material having an upper portion extending along the inner side of the upper margin and end portions extending downwardly along the inner side of the end margins of said side wall, a lining for the bag covering the inner surface of said side wall, angle pieces each having one end rigidly attached to said rigid bottom wall member, fasteners extending through said side wall and through the lower ends of said end portions of said yoke and through said angle pieces and securing said side wall and said yoke and said angle pieces together above the points of attachment of said angle pieces to said rigid bottom wall member, and a supporting member extending substantially horizontally between the lower ends of said end portions of said yoke and engaging said fasteners.

FRANK MEES.